Figure 1:
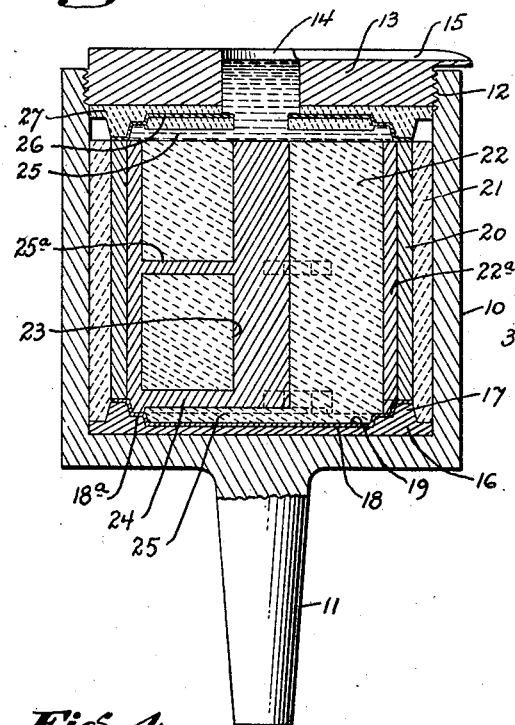

June 26, 1934.  R. D. PIKE ET AL  1,964,647

METHOD OF WELDING

Filed June 17, 1930

INVENTORS.
Robert D. Pike,
Joseph Krill.
BY Townsend, Loftus & Aflett
ATTORNEYS.

Patented June 26, 1934

1,964,647

UNITED STATES PATENT OFFICE 1,964,647

METHOD OF WELDING

Robert D. Pike, Diablo, and Joseph Krill, San Francisco, Calif., assignors to Kalif Corporation, Emeryville, Calif., a corporation of Delaware Application June 17, 1930, Serial No. 461,709

7 Claims. (Cl. 22—204)

This invention comprises a novel method for welding dissimilar metals together, and is applicable for the welding of any metal or alloy to any metal or alloy to which it is possible to weld it.

Broadly stated, the novel method comprises the welding of a metal or alloy in molten form onto a relatively cool other metal in solid form. Another novel feature of the invention is the treatment of the solid or "backing" metal with a very hot molten flux before the molten metal, that is, the "facing" metal, is poured or cast thereagainst; and this may be accomplished by displacing with the molten facing metal the very hot flux while it is in contact with the backing metal.

The invention is very well adapted for the application of a facing metal or alloy onto a backing metal or alloy, said facing usually being comparatively thin, depending upon the purposes for which it is to be used, although the invention is applicable to the manufacture of pieces of metal consisting of two different parts, each of considerable thickness and firmly joined together or welded at the inter-face.

Various metals or mixtures of metals may be used for either the facing material or for the backing material, and they may be suitably joined and united into an integral piece by the novel method, it being understood, of course, that the method is better applicable to certain metals or mixtures thereof than to others. For purposes of illustration only, and not as a limitation for the invention, we will describe the invention as applied to the manufacture of steel-backed bearings having a copper base alloy for the bearing surface, the layer of copper base metal being integrally united and joined to the steel backing directly and without any intermediate layer therebetween. Many bearings of the type described consist of an iron or steel backing having thereon a copper base alloy facing, which alloy may be variable; as, for example, it may contain about 70% of copper, the balance being of lead, with less than ½ of 1% of other elements, either present as impurities or intentionally present; or such alloy frequently contains copper, lead and tin with, perhaps, minor amounts of other elements; or such alloy may be phosphor bronzes, or any other kind of bronze or even copper, while the backing element may be almost any ferrous material, including, for example, steel or cast iron.

Referring to the drawing which forms a part of this specification—

Figure 2:
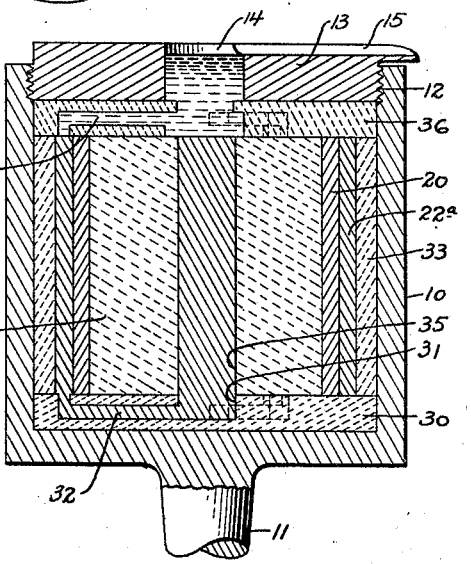
Figure 4:
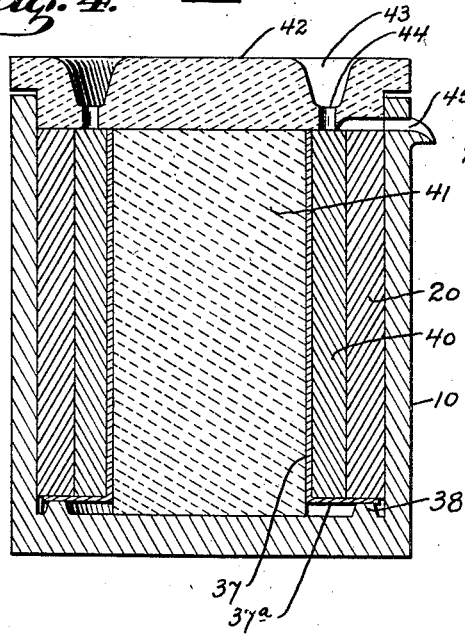
Figure 3:
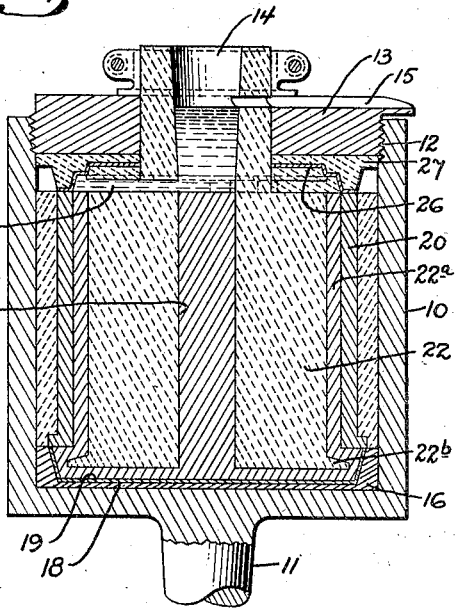

Fig. 1 is a vertical sectional view of a typical set-up for welding bronze inside a steel cylinder as it appears after the bronze has been cast, Fig. 2 is a view similar to Fig. 1 for welding the bronze on the outside of the steel cylinder, Fig. 3 is a modified form of Fig. 1, in section, the steel cylinder and central core having a flange on their lower ends, and Fig. 4 is a similar view of a modified form.

A receptacle 10, preferably of steel, is provided for holding the work, and for certain uses this may have a tapered shank 11 centrally on the bottom side thereof, which shank is used to securely attach the receptacle into a structure such as a centrifugal spinner, when it is desired to impart a rotary motion to the apparatus. It is, of course, to be understood that the centrifugal feature may or may not be employed, and that it may be used at various stages of the process, but in the specific method for making the specific article that is now being described the centrifugal feature is used after the bronze has been poured, the main object thereof being to cause solidification of the molten metal to take place under the hydrostatic pressure induced in the formable mass of cast bronze by centrifugal force.

The receptacle 10 has an open top and is provided with threads 12, a top closure 13 being provided with threads to engage therewith. The closure 13 is provided with a central opening 14 and with a radial channel 15 preferably extending beyond the outer periphery of the receptacle 10. A steel disc 16 is located, preferably removably, in the bottom of the receptacle, this steel disc having an annular rib or boss forming the annular raised surface 17, and inside of said boss there is a central depressed area 18 between which and the surface 17 there is preferably, but not necessarily, an intermediate step 18a. A disc of light sheet steel 19 shaped to conform to the depressed area 18, the boss 17, and to the intermediate step 18a (if the latter is present) is laid on top of the disc 16 to protect the surface of the latter against the molten bronze when poured, whereby any damage done by the pouring of the bronze will affect the disc 19, which is more economically made and replaced than the disc 16. The steel backing member 20 is the member which is to be lined on its inner face with the bearing metal, and such backing is located within and centered by the cylinder 21, made preferably of ceramic material, which, in turn, lies against and is positioned by the inner wall of the receptacle 10. The partial assembly thus far referred to is, in practicing the specific method now being described, given a preliminary heating to about 450° to 650° C., no precaution being necessary during such heating step to prevent oxidation of the backing member because any layer of oxide which may form thereon is conveniently, quickly and easily removed in a subsequent step of the method. The preliminary heating just referred to may be accomplished by any suitable means, and if this be done in a furnace, the partial assembly is removed therefrom and placed in suitable position for casting, which may or may not be, as previously indicated, in a centrifugal spinner.

A core 22, preferably of ceramic material, is provided to form an annular space 22a between the outer face of the core and the inner face of the backing member into which the bronze is to flow and to solidify with a welding effect onto the inner face of the steel backing. The core 22 is provided with a central pouring hole 23 with radial gates 24 and with radial vents 25, it being understood, of course, that intermediate gates 25a may be provided. While this is found desirable for certain classes of work, as, for example, when tall cylinders are to be lined, the bottom 25 of the core 22 is given the shape of a truncated cone, so as to fit closely the disc 19 at the central depressed portion 18, in order that it may be centered thereby.

Before assembling the core, it is preferably heated separately from the other elements to about 1400° to 1500° C. Such hot core, at the temperature indicated, is dropped into place and thereupon the discs 26 and 27, previously heated to about 400° C., are assembled as shown, it being understood that the discs 26 and 27 are substantially the same as the discs 19 and 16, respectively, except that the former are provided each with a central opening registering with the central opening 14, the disc 26 preferably having a smaller opening therein than the central openings in the closure member 13 and in the disc 27, to extend out to the edge of the central opening 23 of the central core 22 at the top thereof. The whole assembly is now secured by screwing into place the top closure 13.

We have found a certain modification of the above procedure desirable when the bearing requires a liner of the copper-base metal on the under face of the flange. A set-up to care for this case is shown in Fig. 3. This set-up is the same in principle as that shown in Fig. 1 except that the core 22 is provided with a lower circular flange 22b and is mounted with the assembly. The bottom of the core is secured a little above the inside bottom of the assembly, leaving a flat annulus through which the poured-in metal is constrained to flow. The flange further influences the poured-in metal to flow across the under face of the flange of the back. We have found that this arrangement is desirable because it prevents mechanical trapping of the molten flux in the metal beneath the flange. In carrying out this modification of our process the core is not, as a rule, separately heated but is preferably heated with the back and to the same temperature before the superheated flux is poured in.

While we have referred to various parts as being made of steel, it is to be understood that they may be made of any desired material which is suitable for the purpose. Also, while we have referred to various parts as being made of ceramic material, it is to be understood that any refractory material may be substituted therefor, but it is preferred to use a mixture of sand and refractory clay, which will withstand the hot temperatures without much vitrification.

The next step in carrying out the novel method is to pour into the central hole 23 a very hot molten flux. Any fluxing material which may be molten and which will remove any layer of iron oxide adhering to the backing member may be used, but it is preferred to use a flux that can be heated up to 1400° or 1500° C. without volatilization or decomposition thereof, and one that will have a relatively low fusing point. Borax serves very well for this purpose, as do mixtures of borax containing, for example, 5% to 10% of sodium metaphosphate, the addition of such metaphosphate lowering the melting point somewhat and considerably reducing the viscosity at about the melting point. It is to be understood, of course, that any suitable flux having the desired characteristics may be used. Enough of the molten flux at about 1400° to 1500° C. is then poured in to completely cover the inside face of the steel backing 20, whereupon any oxide which has been formed during the preliminary heating, or at any other time, upon the surface to which the bronze is to be welded, is almost instantaneously dissolved by the superheated flux, leaving the surface bright and ready for welding. Some heat is transferred from the hot flux to the backing member, but not very much, because of the relatively low heat conductivity of most fluxes, including borax. It is, of course, obvious that the annular space 22a between the backing member 20 and the core 22 may be filled with the flux by direct pouring into the annular space rather than through the central hole 23, when such procedure is preferred.

Immediately after pouring in the flux, or following a short interval thereafter to allow the surface of the steel backing member to become heated somewhat, the molten copper base alloy or bronze is poured down the hole 23, whereupon the poured metal completely displaces the flux, which escapes through the vents 25 and collects in the central opening 14, from which it runs through the channel 15, whence it may be collected in a suitable receptacle and used again. As the bronze assumes its position against the steel backing member, it becomes integrally bonded and united therewith, and so strong is the union that there is no evidence of pulling away, due to cooling strains after solidification, nor can any degree of heating, no matter how severe, cause disseverance of the union.

One of the outstanding novel features of the method is that the heat for welding is supplied by the hot core and/or by the hot flux, so that there is no necessity of highly heating the steel backing. Furthermore, the poured metal is rapidly chilled, which improves its quality as a bearing material.

The whole assembly may be rapidly rotated, if desired, and this is preferably done after the bronze has been poured, but it is to be understood that such rotation is not essential for making a good bond between the facing and the backing, since a practically perfect bond may be obtained without rotation. The rotation at a suitable speed will, however, make the bronze more dense, due to final solidification of the poured metal occurring under the hydrostatic pressure due to the rotation.

As illustrated in Fig. 2, the metal is cast against the outer surface of the cylindrical steel backing member 20. A disc 30, preferably of ceramic material, is placed in the bottom of the receptacle 10, this disc being provided with a central hole or gate 31 and with radial gates 32. The inner surface of the receptacle 10 is lined with heat-resistant material 33, preferably of a ceramic nature, as above described, or, if desired, the lining 33 may be preformed as a separate cylinder which is expediently heated to a high temperature and positioned before casting similarly to the core, as described with respect to Fig. 1. The backing member 20 is placed with its edge resting on the upper face of the disc 30, and the partial assembly is then heated to 450° to 500° C., whereupon the core 34, preferably made of ceramic material, as above described, and heated to about the same temperature as described with respect to the separately heated core of Fig. 1, is then placed in the position as shown in Fig. 2, this core being provided with a central opening 35 registering with the opening 31, whereupon a disc 36, which is likewise preferably made of ceramic material, as described above, and which has been previously warmed, is then positioned at the top of the mold upon the ceramic material 33, the disc 36 being provided with radial vents 36a. The top closure 13 is then screwed down to close the receptacle by means of the screw threads 12, as in Fig. 1. The white-hot molten flux is then poured in through the central opening sufficient to cover the outside face of the steel, and shortly thereafter the molten bronze is poured in, which displaces the flux, as described with respect to Fig. 1, the flux flowing through the vents 36a and thence through the channel 15 to a point where it may be collected and re-used.

In Fig. 4 there is illustrated a modification, according to which both the flux and the bronze flow into the casting space or mold void from above, instead of from below, as through the radial gates 24 of Fig. 1 and 32 of Fig. 2. In this modification of the method a sheet iron or steel core sleeve 37 having a flange 37a at the bottom thereof is so arranged that this flange rests upon the annular boss 38, making a tight joint, the boss 38 being formed preferably integrally with the receptacle 10. The steel backing member 20 is then placed to rest upon the flange 37a, as a result of which an annular chamber 40 is formed between the backing member and the core sleeve, care being taken, of course, to cause the parts to be concentrically arranged.

If desired, a central ceramic core 41 may be used as a heat reservoir, although this is not essential, but, if it is used, it is preheated to any desired temperature, and then placed within the core sleeve, as illustrated. When used, it has the function of acting as a heat reservoir within the mold, which prevents too rapid chilling towards the center of the poured-in flux and bronze. However, it is generally unnecessary, in practicing this modification, to use the preheated core, particularly in making larger sizes of castings, if the entire assembly be preheated to 600° to 700° C.

A pouring head 42 is provided, which may be made of ceramic material or graphite, and this is positioned on top of the assembly, and it may be held in place by any suitable attaching means desired (not shown). The pouring head is provided with an annular channel 43 and one or more pouring holes 44 connected therewith, and it is also provided with a radial channel 45 connecting with the mold void 40.

In carrying out this modification, the very hot flux, usually at a temperature of 1400° to 1500° C., is poured into the annular channel, whence it runs through the pouring holes 44 into the annular casting space 40 and in contact with the surface of the backing which is to be faced with the bronze, and then, after a few seconds' duration, the bronze is poured in in the same manner. The bronze thus displaces the flux, which flows out through the radial channel 45. This method has certain advantages in filling the omission of the gates in the ceramic core, if such a core is used, and in the total omission of the core, if such a core is not used, either of which results in some economy of operation.

There are a great many advantages resulting from the use of the present invention, including the control of the chilling of the metal poured in, by regulation of the temperature to which the core is preheated, or by omission of the core, whereby casting and chilling conditions may be obtained which are best suited for the particular metals used, rapid chilling, but not too rapid, being desirable for improving the qualities of the bearing metal. Another advantage resulting from using the present invention is that the backing or foundation member need not be heated to a very high degree, and consequently it may be made of materials having relatively low melting points, including such metals or alloys as cast iron, bronze, and the like; while another advantage of heating the backing or foundation member to a comparatively low degree is that when it consists of alloy steels, such steels are not annealed, because the temperature may generally be maintained below the critical ranges thereof. Furthermore, the present invention is well adapted for welding thin layers of bearing metals directly onto steel forgings, such, for example, as are employed for the crank pin bearings of large Diesel engines, which has hitherto been impossible. Furthermore, when welding alloys containing copper and lead onto steel, the steel may be maintained at a temperature below the melting point of such alloy, and at such a temperature that the thin layer of molten alloy containing the copper and lead, when applied to the steel surface, is rapidly solidified and intimately welded thereto, the rapid solidification causing a very fine dispersion of the lead, which is a most necessary and desirable feature with respect to such alloys when used as anti-friction bearing surfaces. As a matter of fact, it may be said that the welding and chilling of the poured metal occur simultaneously. While copper and various bronzes, and various alloys containing copper and lead, have hitherto been welded onto steel, yet in all of the processes previously used, it was necessary that the steel be heated above or at least about to the melting point of the metal to be united therewith, and this invariably resulted in the cast metal eroding or dissolving some of the steel, whereby about ½ of 1% of iron was assimilated into the cast metal in the immediate vicinity of the weld. The presence of even the smallest trace of iron as a component of the copper base alloy is objectionable in bearings, because the components of iron and copper, especially when even a trace of carbon is present, as will always be the case when the copper base alloy is welded onto steel or cast iron, are exceedingly hard and cause scoring of the axle or of the surface of any other article moving in contact with the bearing surface so produced. Another objection to the presence of as little as ½ of 1% of iron in a copper lead alloy of the type containing 70% copper, balance lead, with perhaps less than ½ of 1% of other elements, is that it reduces the tensile strength by about one-half.

The present invention makes it possible to weld copper base alloys onto cast iron or steel without any erosion or dissolution whatsoever of the ferrous material; the line of weld is sharply marked, and the copper base alloy in the immediate vicinity thereof does not absorb or take up any iron from the ferrous member, which results in the production of a very high grade bearing; and by the use of the present invention it is possible to weld about ¼ inch of bronze onto a ferrous back, such as a steel back, and then to machine away the bronze until a layer of from .010 inch to .0150 inch only of bronze remains, without there being present any of the "hard spots" typical of the iron-copper-carbon compounds, a result hitherto unobtainable.

While the most specific references made in the foregoing description of the invention relate to the manufacture of bearings and to the materials found most desirable for use in bearings, yet it is to be understood that articles of any desired shape may be made, and with the use of any desired materials, the invention being generally applicable broadly in the art of welding one metal or alloy to another by casting, and many departures may be made from the specific description without departing from the spirit of the invention, the scope of which is defined in the appended claims. It is intended that the term "metal" as heretofore used, and as used in the appended claims, includes not only single metals, but also mixtures of metals or alloys. Various lead-containing metals having a copper base either without or with other metals which may form a bronze with the copper, and which have characteristics desirable in bearings, are known in the art as "plastic bronzes".

Having thus described our invention, what we claim and desire to secure by Letters Patent is—

1. The process of integrally uniting a relatively thin layer of a molten metal to a solid metal which consists in providing a casting space coextensive with the surface of the solid metal, said casting space being bounded by a surface substantially parallel to the surface of the solid metal and being formed of a refractory material at a temperature higher than that required for integrally uniting the two metals, filling the said casting space with a molten flux also at a temperature higher than that required for integrally uniting the two metals, and then displacing the flux from the casting space by pouring in the molten metal.

2. The process of integrally uniting a relatively thin layer of a molten metal to a solid metal which consists in providing a casting space coextensive with the surface of the solid metal, said casting space being bounded by a surface substantially parallel to the surface of the solid metal and being formed of a refractory material at a temperature higher than that required for integrally uniting the two metals, filling the said casting space with a molten flux at a temperature higher than that required for integrally uniting the two metals and sufficiently high to raise the surface of said solid metal to a temperature sufficient for integrally uniting said two metals, while said solid metal is at a temperature lower than that required for integrally uniting the two metals, and then displacing the flux from the casting space by pouring in the molten metal.

3. The method of welding plastic bronze to iron or steel, which comprises contacting with said iron or steel in solid state and at a lower temperature than that required for integrally uniting said two metals, a fluent flux at a temperature sufficiently high to raise a thin film of the iron or steel at the surface thereof to a temperature high enough for integrally uniting said bronze thereto, and then, before the heat imparted by said flux to said iron or steel penetrates deeply into the body thereof, displacing said flux with said plastic bronze in molten condition.

4. The method of welding plastic bronze to iron or steel, which comprises contacting with said iron or steel in solid state and at a temperature below that best for welding, a fluent flux at a temperature sufficiently high to raise a thin film of the iron or steel at the surface thereof to a better temperature for integrally uniting said bronze, and then, before the heat imparted by said flux to said iron or steel penetrates deeply into the body thereof, displacing said flux with said plastic bronze in molten condition.

5. The method of welding plastic bronze to iron or steel, which comprises heating said iron or steel to a temperature close to and below the welding point, contacting the face thereof with a fluent flux at a temperature of about 1500° C., adjusting the duration of said contact to be long enough to bring the face of said backing to a welding temperature but not long enough to permit substantial waste of heat, and displacing said flux with said bronze in molten condition.

6. The method of welding plastic bronze to iron or steel, which comprises contacting with said iron or steel in solid state and at a temperature close to and lower than that required for integrally uniting said two metals, a fluent flux at a temperature sufficiently high to raise a thin film of the iron or steel at the surface thereof to a temperature high enough for integrally uniting said two metals, and then while said hotter film is still thin displacing said flux with said bronze in molten condition at a temperature lower than that of said flux.

7. The method of welding plastic bronze to a steel back, which consists in heating the backing to a temperature insufficient to melt the steel backing, contacting the steel backing on the face to be welded with a superheated fluent flux, maintaining said flux in contact with the steel backing a sufficient length of time to bring the face of the backing to a welding temperature and displacing the flux with molten bronze, and then rapidly chilling the same.

ROBERT D. PIKE.
JOSEPH KRILL.